United States Patent [19]
Harrison

[11] 3,902,884
[45] Sept. 2, 1975

[54] APPARATUS AND METHOD FOR TOUGHENING GLASS

[75] Inventor: Peter John Harrison, Newburgh, England

[73] Assignee: Triplex Safety Glass Company Limited, Piccadilly, London, England

[22] Filed: Mar. 12, 1974

[21] Appl. No.: 450,365

[30] Foreign Application Priority Data
July 20, 1973 United Kingdom............... 34707/73

[52] U.S. Cl. .......................... 65/116; 65/29; 65/161; 137/5
[51] Int. Cl.² .......................................... C03B 27/00
[58] Field of Search ............. 65/104, 114, 116, 161, 65/29; 137/5

[56] References Cited
UNITED STATES PATENTS

| | | |
|---|---|---|
| 1,684,645 | 9/1928 | Smith et al............................ 137/5 X |
| 2,610,445 | 9/1952 | Liberatore........................ 65/116 X |
| 3,275,018 | 9/1966 | Roberts................................. 137/5 X |
| 3,679,388 | 7/1972 | Giddings et al.................. 65/116 X |
| 3,701,266 | 10/1972 | Chisholm........................ 65/104 X |

*Primary Examiner*—Arthur D. Kellogg
*Attorney, Agent, or Firm*—Burns, Doane, Swecker & Mathis

[57] ABSTRACT

Sheets of glass for incorporation in vehicle windows are toughened by quenching each glass sheet when hot with a chilling liquid, for example an oil with a low boiling point additive. The heat transfer properties of the chilling liquid are maintained by employing an immersed electrical resistance element to generate an electrical signal indicative of the heat transfer properties, and employing that signal to control supplying of additional liquid to the chilling liquid.

38 Claims, 8 Drawing Figures

APPARATUS AND METHOD FOR TOUGHENING GLASS

BACKGROUND OF THE INVENTION

1. Field of the Invention

This invention relates to apparatus and a method for toughening glass and for testing the properties of a liquid to be used as a quenching medium for the thermal toughening of glass.

2. Description of the Prior Art

It is known to toughen glass articles, for example sheets of glass, by heating the article to a temperature above its strain point, and then immersing the article in a body of chilling liquid, the stresses obtained, being dependent on the initial glass temperature and the constitution of the body of chilling liquid.

The chilling liquid may be a mineral oil, and in some instances, particularly where high strength glass is required, the chilling liquid may include, as additive, a minor proportion, for example up to 4 percent, of a liquid having a much lower boiling point, for example carbon tetrachloride or toluene. A mineral oil is a complex blend of fractions and is submitted to quite severe thermal treatment when it is maintained for long periods at a temperature above 200°C whilst successive glass articles of substantial thermal capacity and at temperatures for example in the range 600° to 700°C are immersed in it.

It has been realised that the composition of the oil undergoes change and that due to evaporation the proportion of any low boiling point fractions and any low boiling point additive present in the chilling liquid decreases with time. These changes may tend to affect the thermal treatment which the glass undergoes and in time identical glass objects quenched under otherwise identical conditions may have different stresses produced in them. When toughening glass sheets for inclusion in the windscreens or other windows of vehicles such as cars or aircraft, it may be desirable to control accurately the stresses induced in individual sheets to within specified limits so that a product having specified strengths and fracture characteristics is produced consistently throughout long periods of process operation. Also it may be necessary from time to time to effect controlled changes in the product.

SUMMARY

It is thus desirable to test the heat transfer properties of the chilling liquid, which may vary by reason of decomposition of the liquid when hot glass articles are quenched in it, or by reason of evaporation of low boiling point components of the liquid. When a body of chilling liquid is being used for quenching a succesion of hot glass articles, the heat transfer properties are monitored and, if a variation is sensed steps are taken to restore the heat transfer capability to a datum state so that each of a succession of articles receives substantially the same treatment. Further, it is desirable to be able to compare the tested heat transfer properties of different liquids, for example one oil with another, or one oil with different proportions of a given additive, or one oil with the same proportion of different additives, so that, given a particular specification for the stresses to be induced in an article, then a knowledgeable selection of the liquid to be employed can be made based on the tests of their heat transfer properties.

The present invention provides apparatus and a method for use in testing and monitoring the heat transfer capability of a chilling liquid to be used as a quenching medium for the thermal toughening of glass. An electrical sensor, e.g. an electrical resistance element, contacts the chilling liquid, and produces an electrical data signal indicative of the heat transfer capability of the liquid. Variation in that signal is employed to maintain the heat transfer properties of the chilling liquid, for example by controlling the supply of an additional liquid to the chilling liquid to regulate the constitution of the chilling liquid and thereby maintain its efficacy as a glass toughening liquid.

BRIEF DESCRIPTION OF THE DRAWINGS

Some embodiments of the invention will now be described, by way of example, with reference to the accompanying drawings in which.

DESCRIPTION OF THE PREFERRED EMBODIMENTS

Figure 1:
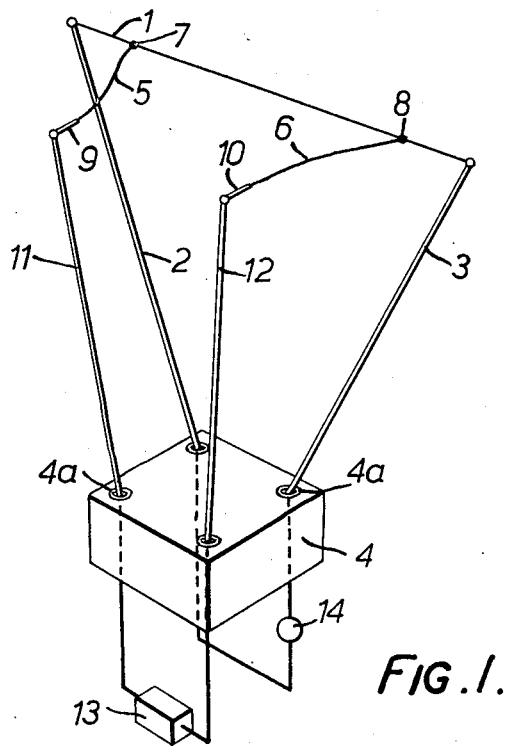
FIGS. 1 and 2 show perspective views of two examples of electrical resistance elements for use in apparatus according to the present invention together with diagrammatic representations of the electrical connections to be made to them.

Referring first to FIG. 1, an electrical resistance element 1 is used as a sensor for testing the heat transfer properties of a chilling liquid and is in the form of a straight length of platinum wire of circular cross section. This wire is supported by two thicker platinum wires 2 and 3 which pass into and are supported by a single electrically insulating block 4.

The resistance element 1 may for example be 0.22 mm in diameter whilst the wires 2 and 3 are 0.88 mm diameter.

The block 4 is of ceramic material and the wires 2 and 3 are secured to it by screws, not shown, clamping the wires 2 and 3 within sleeves 4a which are secured by adhesive in bores in the block 4.

Two fine gold leads 5 and 6 are welded to the resistance element 1 to form connection points 7 and 8 spaced along the element 1 by a predetermined distance, for example 3 cm. The leads 5 and 6 are very fine, for example 0.02 mm in diameter, in order to minimise conduction of heat through them away from the element 1. The ends of the leads 5 and 6 remote from the resistance element 1 are welded to fine platinum wires 9 and 10 which are supported by thicker platinum wires 11 and 12 which are themselves supported by the block 4, being secured to it within sleeves 4a in the same manner as the wires 2 and 3. The whole assemble is constructed so that in use the block 4 can conveniently be supported with the element 1 and parts at least of the wires 2, 3, 11 and 12 immersed in a body of chilling liquid in a quench tank.

Electrical connections run through the block 4 from the wires 11 and 12 to a voltage measuring device 13 and from the wires 2 and 3 to an adjustable stabilised electric supply circuit 14. The source 14 may be a stabilised current supply which is adjustable, and constitutes a stabilised parameter of the supply. The voltage measuring device is effectively connected between the connection points 7 and 8 on the resistance element 1, to provide a measurement of a second parameter being the voltage drop across the part of the resistance element between the points 7 and 8.

The constant current source 14 may be any known form of circuit for supplying a stabilised DC current but will usually be one including some adjustment, for example a potentiometer, for adjusting successively the magnitude of the current supplied to a number of different values. The voltage measuring device 13 may simply be a suitable meter or some other form of known indicator or recorder to provide a visual indication of the electrical data indication, namely the voltage between the points 7 and 8, of the heat transfer capability of the liquid. As will be described the voltage between the points 7 and 8 may be fed to control circuits responsive to changes in the magnitude of the potential drop along that part of the resistance element 1 lying between the connection points 7 and 8.

Figure 2:
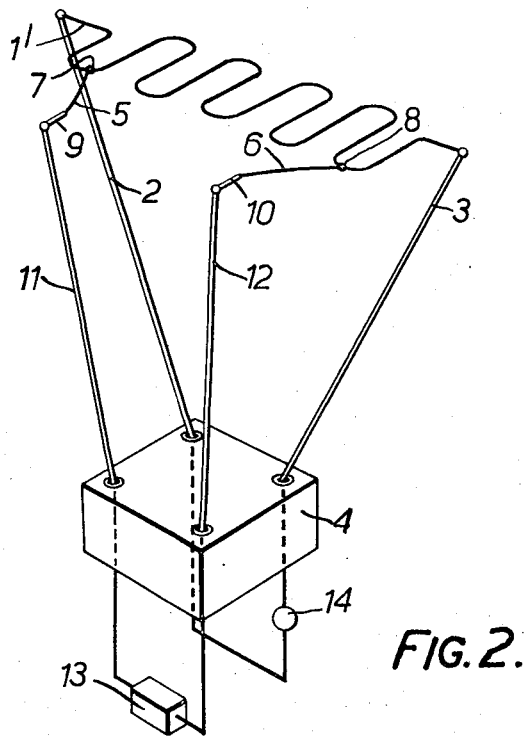

In the apparatus shown in FIG. 2, the resistance element 1' is formed into a sinuous shape so as to enable a greater length, for example 18 cm, of platinum wire 0.22 mm in diameter to be included between the connection points 7 and 8 without greatly increasing the spacing of those points.

The usefulness of the apparatus according to the present invention in assessing the heat transfer properties of a chilling liquid in which the hot glass is to be quenched is based on the following considerations:

If an electrically conducting wire of uniform circular cross section, such as the wires 1 and 1' in FIGS. 1 and 2, is immersed in a liquid, for example a body of chilling liquid for quenching glass sheets, and held in a generally horizontal attitude, the heat transfer coefficient H between the wire and the liquid is given by the formula:

$$H = \frac{VI}{J \pi d l \Delta T} \text{ cal. cm}^{-2}. °C. S^{-1}$$

where:

$V$ is the voltage drop along the wire between the points 7 and 8, $I$ is the current flowing in the wire (amps), $J$ is the mechanical equivalent of heat, $l$ is the length of wire between the points 7 and 8, $d$ is the diameter of the wire, and $T$ is the temperature difference between the wire temperature $T_W$ and the liquid temperature $T_A$.

The measured heat transfer coefficient $H$ and the manner in which it varies with wire temperature for a given liquid temperature, can be used to assess the heat transfer capability of the chilling liquid with respect to hot glass and its efficacy as a quenching medium. A variation in wire temperature can be obtained by varying the stabilised current flowing in the wire through a succession of set values for example in the range 0 to 10 amperes. For each set value of the current $I$, the voltage drop $V$ between the points 7 and 8 on the wire is measured, and from the set value of the stabilised current and the measured voltage drop, the resistance $R_T$ of that part of the wire is calculated. By using known information on variation of the resistance of the wire with temperature, either obtained experimentally or in some cases for example when platinum wire is used by the use of tables, the wire temperature $T_W$ and therefore the value of $\Delta T$ is calculated. From these values the heat transfer coefficient $H$ is calculated and a graph drawn of variation of heat transfer coefficient $H$ with wire temperature $T_W$.

The heat transfer capability of the liquid is represented by the heat transfer coefficient $H$ and values of $H$ for a particular example calculated in the manner described above are given in Table I following:

The constant factors in the example were:
Temperature of chilling liquid = 210°C
Diameter of wire = 0.22 mm
Length of platinum wire between points 7 and 8 = 4.2 cm

TABLE I

| Current Setting Amps | Measured Voltage V Volts | $R_T$ Ohms | Calculated Wire Temperature $T_W$ °C | $\Delta T$°C | Heat Transfer Coefficient H Cal.cm$^{-2}$.°C. sec$^{-1}$ |
| --- | --- | --- | --- | --- | --- |
| 2 | 0.43 | 0.215 | 244.13 | 34.13 | 0.0208 |
| 4 | 0.955 | 0.239 | 298.18 | 88.18 | 0.0357 |
| 6 | 1.57 | 0.261 | 350.2 | 140.2 | 0.0553 |
| 7 | 1.96 | 0.280 | 392.04 | 182.04 | 0.0621 |
| 8 | 2.34 | 0.292 | 420.48 | 210.48 | 0.0733 |
| 10 | 2.98 | 0.298 | 433 | 223.0 | 0.1101 |

Using the values given in Table I a curve of variation of heat transfer coefficient $H$ plotted against wire temperature $T_W$ is obtained. The above example relates to the curve F of FIG. 3 which as described below relates to the use of a chilling liquid comprising a major proportion of the commercially available oil MOBIL CYLREX FM containing the minor proportion of 0.5 percent by volume of carbon tetrachloride.

Figure 3:
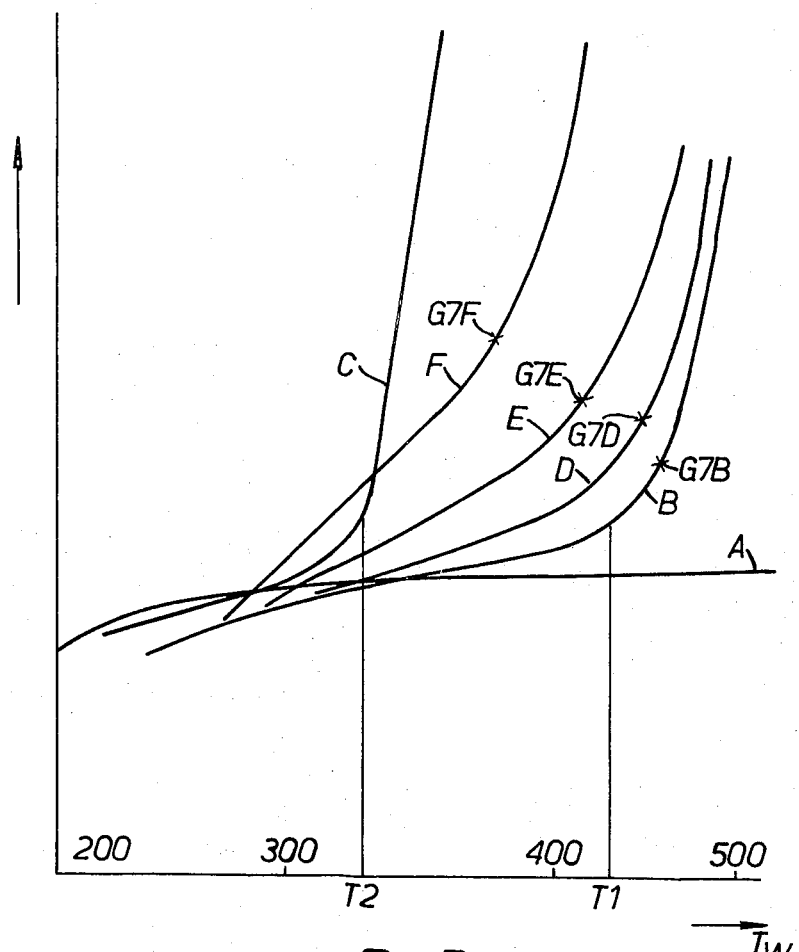
FIG. 3 shows curves illustrating the operation of the resistance elements of FIG. 1 or FIG. 2 in glass toughening apparatus employing a chilling liquid in which hot glass is quenched.

FIG. 3 shows a number of curves illustrating the operation of the sensors of FIGS. 1 and 2 in testing the heat transfer coefficients of chilling liquids for use in toughening glass. The curves show variation of heat transfer coefficient $H$ with the temperature of $T$ of the resistance element 1 for the sensor of FIG. 1, when immersed in a body of oil maintained at a temperature of 210°C.

Curve A is a theoretical curve for the resistance element of FIG. 1 assuming all the heat transfer takes place by ordinary convection from a horizontal wire, the oil being a commercially available MOBIL CYL- REX FM. This curve was calculated using the dimensionless correlation of McAdams given in "Heat Transmission" by W. H. McAdams, published by McGraw Hill, third Edition, 1954, page 176.

Curve B is the curve for the same oil at 210°C obtained in practice and it will be noted that although the curves are similar at lower element temperatures, when the element temperature is above 450°C the measured heat transfer coefficient increases quite steeply. Observation shows that this increase, which may occur at temperatures of the order of 370° to 480°C, coincides with the onset of nucleate boiling in the liquid on the surface of the element 1. This may be due to vaporisation and/or to the onset of some decomposition process in the liquid.

Curve C is similar to curve B but was obtained using a different oil, CASTROL ILOQUENCH No. 3 maintained at 210°C. The steep increase in heat transfer coefficient due to the onset of nucleate boiling occurs at a lower temperature of the element 1 than with CYLREX FM.

Curves D, E and F, were obtained in similar manner to curve B but in each case a major proportion of the oil, CYLREX FM, contained a minor proportion of carbon tetrachloride as low boiling point additive. The minor proportions of additive were 0.02 percent by volume for curve D; 0.1 percent by volume for curve E; and 0.5 percent by volume for curve F. From the series of curves B and D to F, representing a variation of the heat transfer coefficient and the element temperature for different values of the stabilised current flowing through the element, it can be seen that the addition of increasing minor amounts of carbon tetrachloride bring about increases in the heat transfer coefficient and a general shifting of the curves.

For example, if the stabilised current is set at 7 amps, in the resistance element 1' of FIG. 2, the values of heat transfer coefficient $H$ are 0.4888;0.0541; 0.056; and 0.0621 cals. cm$^{-}$. °C. sec$^{-1}$ given by the points $G_{7B}G_{7D}G_{7E}$ and $G_{7F}$ in FIG. 3 and, since $H$ is proportional to the measured voltage, the voltage will also vary correspondingly. For example when the chilling liquid is constituted from a major proportion of CYLREX FM and a minor proportion of carbon tetrachloride, a reduction of 1 volt measured between the points 7 and 8 in a voltage of about 8 volts was obtained on adding 0.15 percent by volume of carbon tetrachloride to pure new CYLREX FM. The relationship is roughly linear, the voltage decreasing as the percentage of additive increases. When a stabilised voltage supply source is used, a roughly linear variation in the measured current is obtained for a predetermined applied constant voltage as the proportion of additive changes.

In the glass quenching processes in which hot glass is quenched in a chilling liquid it has been shown that the surface of the glass undergoes an initial immediate temperature drop, the magnitude of which influences the stresses produced in the glass. The high temperature end of the drop is determined by the initial glass temperature and the lower end of the drop is largely determined by the characteristics of the chilling liquid. Observation has shown that, to a first order, the temperature at the lower end approximates to that of the elbow on the curves shown in FIG. 3, for example temperature $T_1$ at the beginning of the elbow on curve B which is about 440° to 450°C for MOBIL CYLREX FM, or temperature $T_2$ which is about 340°C at the beginning of the elbow on curve C for CASTROL ILOQUENCH No. 3. With the different proportions of carbon tetrachloride added to CYLREX FM, on curves C, D and E the beginning of the elbow, although less distinct, can be seen to occur at temperatures decreasing steadily below 440°C for increasing proportions of the additive.

At temperatures lower than those at the elbows of the curves, the rate of change of heat transfer coefficient is approximately constant and substantially in accordance with classical heat exchange theory between a liquid and a hot body within it. Because of the increased rate of change of heat transfer coefficient at higher temperatures, the measured second parameter, current or voltages, varies sensitively with change of the stabilised magnitude of the one parameter of the supply. In addition, if there should be changes in the constitution of the liquid affecting the heat transfer coefficient, and thus the quenching properties of the liquid, this too will give rise to quite sensitive variations in the measured second parameter even if the magnitude of the stabilised parameter of the supply is not varied. This variation can be employed as an indication of change in the liquid which can be compensated for to restore the heat transfer capability of the liquid to the desired datum value represented by the desired value of heat transfer coefficient H.

In practice, the heat transfer coefficient between the element and any liquid in which it is immersed will vary with the attitude of the element, for example it will differ as between horizontal and vertical wire elements. For this reason, it is necessary to specify a standard attitude for a given element in order to obtain comparable and repeatable results. With an element in the form of a wire, the standard attitude will usually be with the wire horizontal.

With an unknown liquid, a curve obtained using the apparatus of FIG. 1 or FIG. 2, similar to the curves B to F of FIG. 3, can be compared with those curves to obtain an indication of the lower end of the immediate glass surface temperature drop and through the comparison of the magnitudes of the heat transfer coefficients, an indication of the severity of the quench i.e. the rate at which heat is withdrawn from the glass surface and thus the transient stresses to which the glass is subjected as it cools.

The highest current level used corresponded to a maximum excess wire temperature of approximately 400°C, and at each current level the voltage between the points 7 and 8 on the element 1 was recorded by an X-Y recorder.

The heat transfer coefficient $H$ and an element temperature was calculated from each pair of values of $I$ and $V$ in the manner described above. The electrical data signals representing the current and voltage values could be fed for example to an analogue computer, the current $I$ being varied continuously but slowly from one end of the range to the other, and the computer being adapted and/or programmed to give continuous outputs of heat transfer coefficient $H$ and the element temperature $T_H$ which can either be plotted on an X-Y recorder or printed out separately and plotted manually.

In this manner therefore, the apparatus described with reference to FIGS. 1 and 2 can be employed to obtain an assessment of properties of a liquid as a quenching medium. It is found that when working with sheets of soda-lime-silica glass the temperature at the lower end of the immediate temperature drop must not be more than a predetermined amount, for example, about 145°C, below the strain point of the glass.

The position of the elbow on the curves obtained is of interest in assessing the usefulness of the liquid.

Knowledge of the magnitude of the heat transfer coefficient $H$ at the temperatures concerned gives an indication of the yield of acceptable quenched articles that would be obtained with any given chilling liquid. The sharpness of the elbow on the curves determines to some extent the rate at which the surface temperature of the glass falls during quenching and hence the magnitude of the transient stresses to which it is subjected. These affect the yield in terms of survival of the glass being quenched. The yield can be improved by increasing the initial glass temperature but problems may then arise especially where the optical quality of the quenched article is important for example in glass sheets for windscreens, or in ophthalmic lenses. The sharpness of the elbow is thought to be determined by the range of boiling points of the components of the chilling liquid.

The variation in the voltage drop $V$ between the points 7 and 8 on the element 1 or 1' for a constant value of the current I, following any change in the liquid affecting the heat transfer coefficient, can be utilised in an apparatus and processes for toughening glass sheets to sense any such changes and to effect an indication or control function.

If a stabilised voltage source is used, there will be a similar variation of the current flowing for a particular stabilised voltage value supplied.

When using as chilling liquid an oil with a minor proportion of a low boiling point additive, the stresses produced in sheets of a soda/lime/silica glass vary with the proportion of additive present. The fracture properties of toughened glass sheets vary with the magnitude of the stresses in them, and when the glass sheet is for use in a motor vehicle windscreen, constituted by a single toughened sheet of glass, or by a laminate including one or more toughened sheets of glass it can be important to induce accurately required stresses in the sheets employed to ensure that under the different conditions in which the windscreens may be broken in use, the fracture occurs in the manner and under the forces intended.

Thus, in a process for the mass production of toughened glass sheets for use in or as windscreens by a process in which the sheets are heated and quenched in a chilling liquid the process should be reproducible at least to the extent that the stresses in the sheets produced are within specified limits and remain so throughout extended production runs. Such a process and apparatus for carrying out the heating, bending and quenching of glass sheets is described in co-pending application Ser. No. 450,459 for "Bending Glass Sheets" filed Mar. 12, 1974, the disclosure of which is hereby incorporated by reference. In such a continuous process it is desirable to detect and correct any change in the heat transfer properties of the liquid, and this is effected by incorporating an apparatus as described with reference to FIGS. 1 or 2 in the liquid quenching plant to effect automatic control by applying a signal representing a measured voltage V or current I to a control apparatus designed to regulate the heat transfer properties of the chilling liquid in a quenching tank in response to variation of the measured voltage or current indicating a change in that heat transfer property.

When the chilling liquid is an oil, the automatic control feeds to the quench tank oil drawn from a fresh unused supply so that the condition of the chilling liquid is renewed.

When the chilling liquid is an oil with a minor proportion of low boiling point additive, for example toluene, depletion of the additive is the most immediate cause of change, and the automatic control regulates the addition of an oil/additive mixture containing a higher proportion of additive than is required in the quench tank. Pure additive could be added but in practice this may be unsatisfactory owing to the tendency of the additive to evaporate when added in the pure state.

When commencing production with fresh oil, whether with an additive present or not, it has been found that the thermal treatment involved in maintaining the oil at a temperature of about 200°C or more, produces in the first few hours changes affecting the quenching properties of the oil, after which the properties change much less rapidly. To achieve predictable and consistent production, it is desirable to hold the oil initially at the required operating temperature, monitoring its condition with the apparatus described, until its heat transfer properties have settled to the condition in which the rate of change slows.

Figure 4:
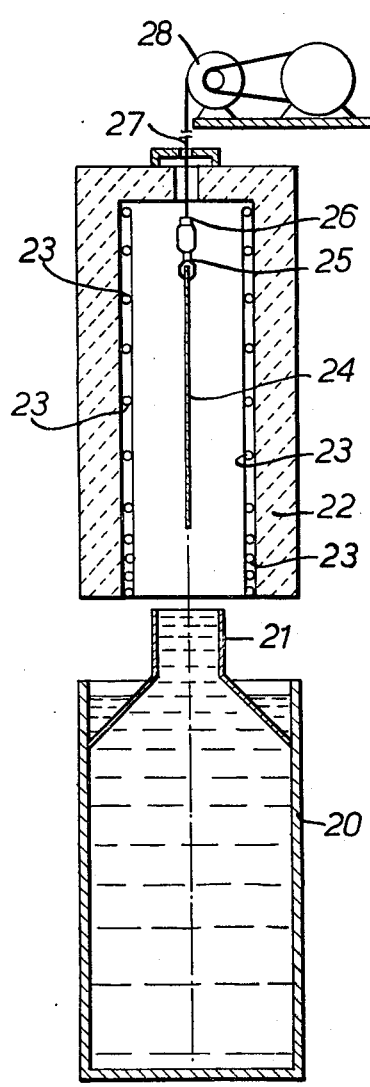
FIG. 4 is a diagrammatic representation of parts of apparatus according to the invention for toughening glass sheets including a tank of chilling liquid, FIGS. 5a and 5b together form a more detailed schematic diagram of liquid supply apparatus associated with the tank of chilling liquid shown in FIG. 4.

To effect these controls the apparatus for use in toughening glass articles by quenching them when hot in a body of chilling liquid, includes a sensor as described with reference to FIG. 1 or FIG. 2, mounted with the resistance element 1 or 1' immersed in the body of chilling liquid with the wire lying in a generally horizontal attitude. The main features of such an apparatus are shown diagrammatically only in FIG. 4 of the drawings and include a quench tank 20 maintained full of the chilling liquid up to the level of a weir 21 over which the liquid flows into a surrounding moat described more fully with reference to FIGS. 5a and 5b. Above the tank 20 is an electrically heated furnace 22 provided with heating elements 23. A sheet 24 of glass for toughening is suspended from tongs 25, for example two or four tongs spaced along the upper edge of the sheet, which are themselves mounted on a tong bar 26 that is suspended by cables 27 from electrically operated hoists 28. The glass sheets to be toughened are introduced into the furnace 22 suspended from the tongs 25, the furnace being maintained at a temperature such as to enable the sheets to be heated rapidly and uniformly to a temperature approaching the softening point of the glass for example a temperature of in the range 610° to 720°C for soda/lime/silica glass. The chilling liquid in the tank 20 is MOBIL CYLREX FM and is maintained at a suitable temperature, for example in the range 150° to 260°C by electrical heaters, not shown. When the sheet 24 is heated to the desired temperature, the hoists 28 are operated to lower it rapidly into the chilling liquid in the tank 20.

Figure 5A:
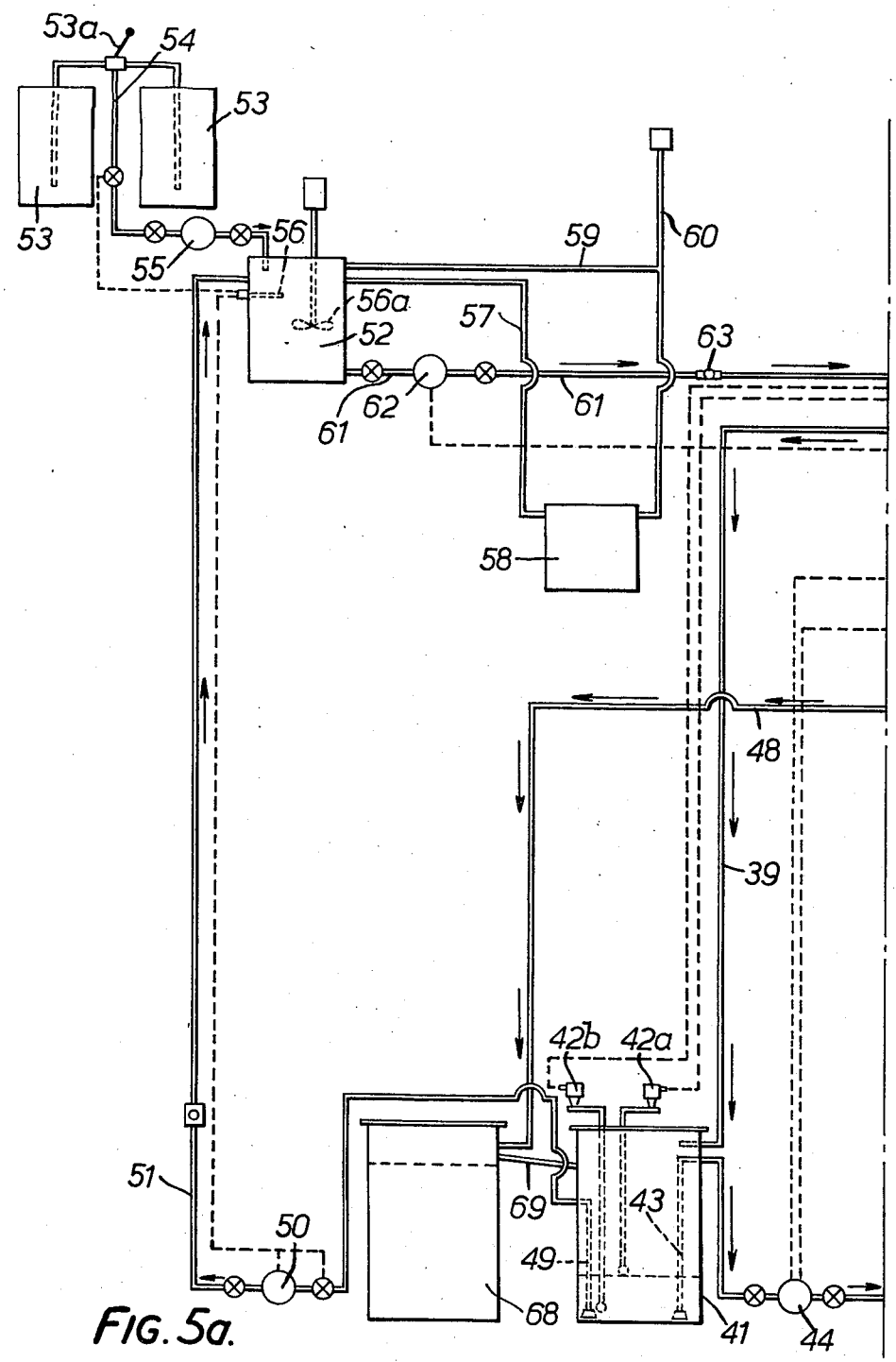
Figure 5B:
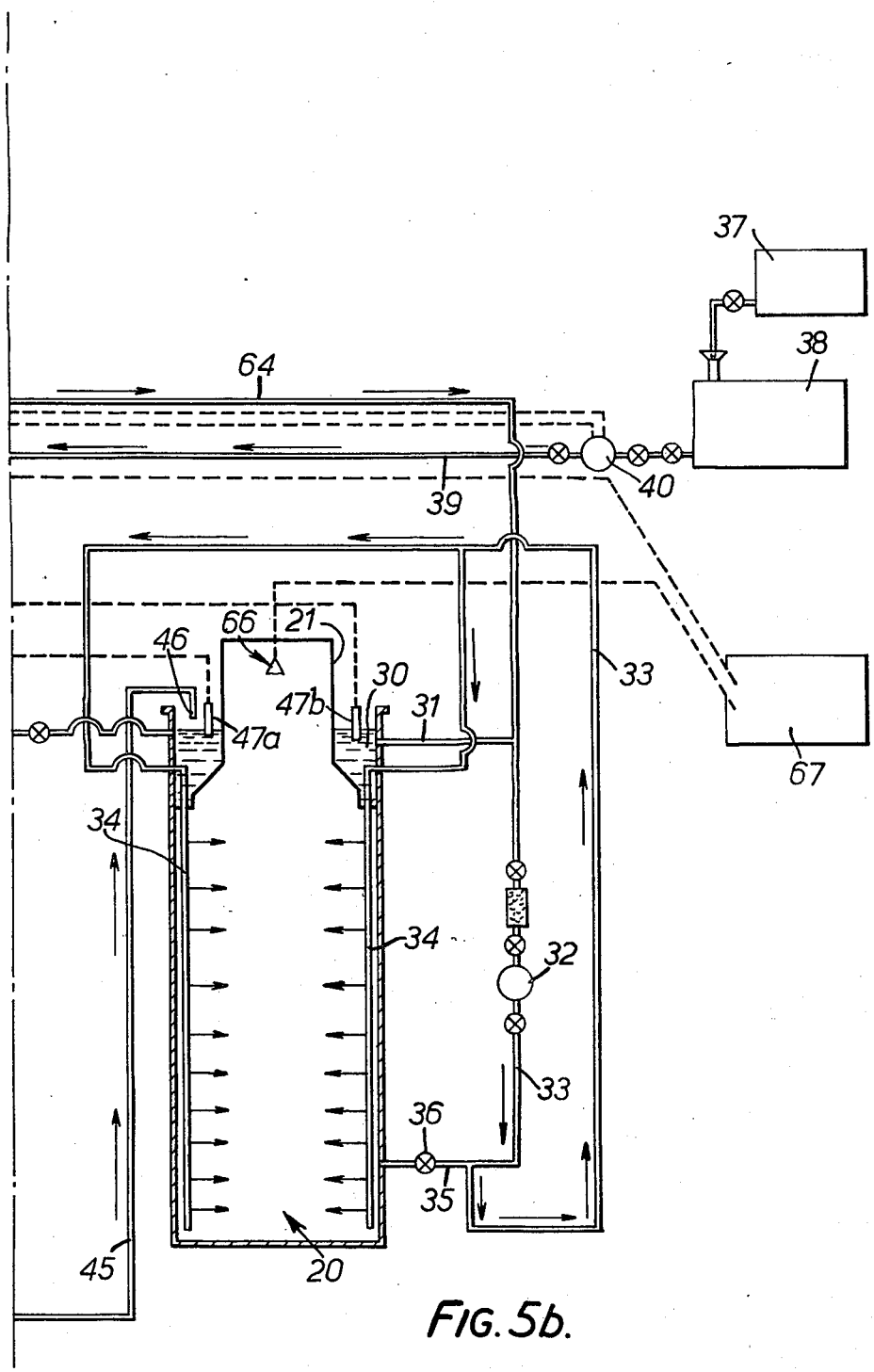

FIGS. 5a and 5b illustrate the control system that is provided to enable the quenching properties of the chilling liquid to be sensed and maintained within required limits in operation.

In FIGS. 5a and 5b the quench tank 20 is shown in conjunction with automatic oil and additive replenishment equipment for the controlled feeding of additional liquid into the chilling liquid.

An outlet pipe 31 leading from the moat 30 which surrounds the weir 21 in the quench tank 20 is connected by a pump 32 to pipe 33 which branches into two supply lines 34 leading vertically into the quench tank 20. A branch pipe 35 leads through a hand operated valve 36 into the bottom of the quench tank 20, the valve 36 normally being closed. The pump 32 draws chilling liquid from the moat 30 through the outlet pipe 31 and feeds the liquid through the pipe 33 and the two supply lines 34 into the quench tank 20. Thus chilling liquid is being continually circulated through the quench tank 20 and spills over the upper edge of the weir 21 into the moat 30.

A supply of fresh oil is contained in a first reservoir 37 in the form of a drum which feeds into a drum 38. An outlet pipe 39 leads from the drum 38 through a feed pump 40, hereinafter referred to as a first pump, into an overflow tank 41 which contains float operated high and low level switches 42a and 42b which are sensitive to the level of liquid in the overflow tank 41. Should the level of the oil in the overflow tank 41 fall below a bottom level, operation of the low level switch 42b, hereinafter referred to as a first liquid level sensing means, results in operation of the first feed pump 40 to supply oil from the drum 38 into the overflow tank 41 through the pipe 38. When the liquid reaches an upper level in the overflow tank 41 the feed pump 40 is stopped by operation of the high level switch 42a.

A dip tube 43 in the overflow tank 41 is connected through a pump 44 to a pipe 45 having an outlet 46 into the moat 30. Loss of chilling liquid from the quench tank 20 can occur by evaporation and by drag-out of liquid from the quench tank 20 on the quenched glasses. Such loss of liquid from the quench tank 20 results in a fall in the level of the liquid in the moat 30, which level is sensed by high and low level, thermocouples 47a and 47b which control the operation of the pump 44. When the liquid in the moat 30 is at its optimum level, just below an overflow pipe 48 leading from the moat 30, the high level thermocouple 47a is just dripping into the liquid and the pump 44 is switched off. A drop in the level of the liquid in the moat 30 uncovers the high level thermocouple 47a and eventually uncovers the low level thermocouple 47b the tip of which is located just above the level of the outlet pipe 31 leading from the moat 30. The fall in output of both the thermocouples 47a and 47b starts operation of the pump 44, and chilling liquid is fed from the overflow tank 41 through the dip tube 43 and the pipe 45 into the moat 30. When the liquid reaches its optimum level in the moat once again and the tips of both the thermocouples 47a and 47b are again covered the rise of output of both the thermocouples 47a and 47b causes the pump 44 to be switched off.

A dip tube 49 in the overflow tank 41 is connected through a pump 50, hereinafter referred to as a third pump, to a pipe 51 which leads into a mixing container 52 forming part of a system for supplying oil and additive mixture to the quench tank. A second reservoir consists of two tanks containing different fresh additive liquids, for example toluene and carbon tetrachloride, are connected through a change-over valve 53a to a common outlet pipe 54 which leads through a pump 55, hereinafter referred to as a second pump, into the mixing container 52. A second liquid level sensing means in the form of a capacitance level probe 56, and a stirrer 56a are mounted in the mixing tank 52. When the level of the liquid in the container 52 falls below the level of the capacitance probe 56, operation of the pumps 50 and 55 is initiated. Operation of the pump 50 feeds liquid from the overflow tank 41 into the container 52 through the pipe 51, and operation of the pump 55 feeds fresh additive liquid from one of the tanks 53 into the container 52 through the pipe 54. The feed rates of the pumps 50 and 55 are governed so as to achieve a required proportion, for example between 5 and 20 percent, of additive liquid in oil in the container 52, the particular percentage being chosen so as to be higher than the minor proportion, 4 percent or less, maintained in the chilling liquid in the quench tank 20. Pump 55 is switched off when the liquid level in the mixing container 52 rises above the level of the probe 56.

The mixing container 52 has an overflow pipe 57 which leads to an overflow tank 58. A vent pipe 59 leading from the mixing container 52 connects with a vent pipe 60 leading from the overflow tank 58. An outlet pipe 61 from the mixing container 52 connects through a pump 62 and pressure switch 63 with a manifold pipe 64, which is connected to the outlet pipe 31 leading from the moat 30 to the pump 32.

An electrical sensor 66 of the kind illustrated in FIG. 1, is fitted in the quench tank 20, 38 cm below the top of the weir 21 and is connected to a control circuit 67 which is illustrated in more detail in FIG. 6. The control circuit 67 controls the operation of the pump 62 to regulate supply of the oil/additive mixture from the mixing container 52 into the quench tank 20. When the percentage of additive in the oil in the quench tank 20 falls below a predetermined value there is a variation in the heat transfer properties of the chilling liquid which is sensed by the sensor 66 and the control circuit 67 operates to cause operation of the pump 62. Operation of the pump 62 causes a rise in pressure in the pipe 61 downstream of the pump 62 which causes opening of the pressure switch 63. Thus the rich additive/oil mixture is fed from the mixing container 52 through the manifold pipe 64 into the moat outlet pipe 31 upstream of the pump 32. The additive/oil mixture is then fed by the pump 32 through the pipe 33 and the two supply lines 34 into the quench tank 20 to regulate the constitution of the body of chilling liquid in the quench tank in response to variation in an electrical signal generated by the sensor. The pump 32 is set to run at a higher pumping rate than the pump 62 so that the pump 32 draws liquid through the pipe 31 from the moat 30 in addition to pumping the additive/oil mixture which is fed through the manifold pipe 64 by the pump 62. When the proportion of additive liquid in the oil in the quench tank 20 reaches the desired value which restores the heat transfer capability of the chilling liquid to a datum value by the sensor 66 is effective through the control circuit 67 to switch off the pump 62, the pressure switch 63 returning to the closed condition.

The feed of additional liquid into the quench tank 20 causes a rise in the liquid level in the moat 30 of the quench tank 20. Chilling liquid overflows from the moat 30 through the overflow pipe 48 which is connected to a buffer tank 68 which also serves to cool the liquid. The buffer tank 68 has an overflow pipe 69 which leads into the overflow tank 41. When the buffer tank 68 fills to the level of the overflow pipe 69 liquid flows from the buffer tank 68 through the overflow pipe 69 into the overflow tank 41.

Figure 6:
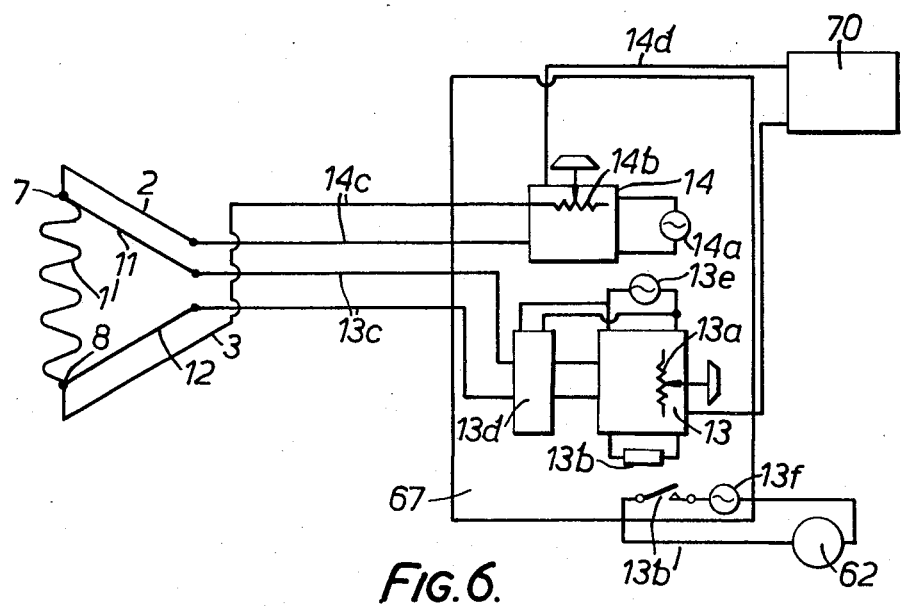
FIG. 6 illustrates in greater detail electrical connections within the apparatus of FIGS. 5a and 5b.

The control circuit 67, FIG. 6, includes both the stabilised current source 14 and the voltage measuring device 13 of FIGS. 1 and 2. The source 14 is connected across an AC mains supply 14a and is provided with a manually settable potentiometer 14b incorporated in its circuit in known manner to enable the magnitude of the stabilised current supplied to be adjusted over a range of values, for example 0 to 10 amps as set out in Table I. Leads 14c connect the source 14 to the wires 2 and 3 in the sensor 66. The voltage measuring device 13 is a conventional ON/OFF controller having a dead band of 100 millivolts which compares the magnitude of the voltage applied across its input terminals with a set point or datum voltage derived from a manually adjustable set point potentiometer 13a provided in conventional manner on the controller 13. In known manner, the controller 13 operates to energise a relay 13b depending on whether or not the applied voltage is greater than the set point voltage. The voltage drop V measured between the points 7 and 8 on the resistance element increases with decreasing percentage of additive in the oil. The set point voltage can be set to represent a desired minor proportion of additive and increase of the voltage V above the set point indicates that the actual proportion of additive has fallen below that minor proportion. To eliminate spurious noise signals, the leads 13c from the sensor 66 are connected to the input of an active low pass filter 13d the output of which is connected directly to the input of the controller 13. Power is supplied from the AC mains source 13e to both the controller 13 and the filter 13d.

The relay 13b has a normally open contact 13b1 which is connected in series with a further AC mains supply 13f and with the pump 62 for supplying the additional liquid, that is additive-rich mixture of additive and oil from the mixing container 52 to the quench tank 20. In this way the mixture is supplied to the tank 20 whenever the sensor 66 senses that the proportion of additive in the tank 20 falls below the datum level set by the set point potentiometer 13a of the controller 13.

In order to monitor visually the heat transfer properties of the chilling liquid a voltage output from the electric supply source 14 is connected by 14d to an X–Y recorder indicated at 70. A signal indicative of the current flowing through the sensor wire is transmitted to the recorder 70 on a line 13g connected to the controller 13..

Figure 7:
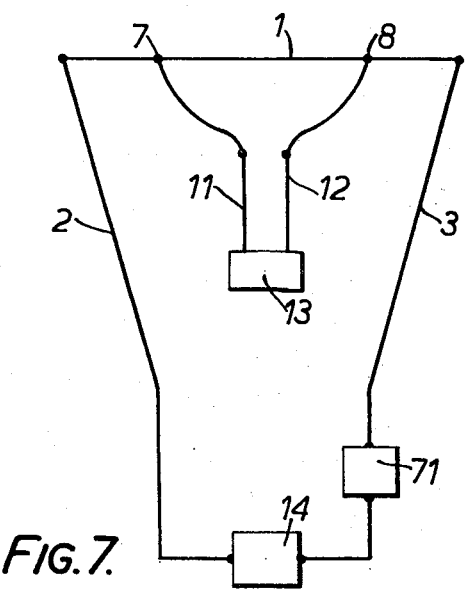
FIG. 7 illustrates an alternative connection of the resistance element for use with a stabilised voltage source.

When an oil is used with no additive, the system can be modified to supply fresh oil in sufficient quantities to renew the heat transfer properties of the liquid in the quench tank 20 when the sensor 66 senses that there is an unacceptable change in its properties as represented by a variation of the sensor potential V above or below the level set within the controller 13. In an alternative arrangement illustrated in FIG. 7, the stabilised parameter is the voltage of the supply source, the electrical supply 14 being a stabilised voltage supply which is adjustable to enable the magnitude of the stabilised voltage applied between the leads 2 and 3 to be varied. Current measuring means 71 is connected in series with the source 14 to measure a second parameter, namely the current flowing through the element 1, which current will vary as the heat transfer properties of the chilling liquid vary. An electrical data signal is derived from the current measuring means 71 and is employed in the manner described above to restore the heat transfer capability of the chilling liquid. The voltage between the connection points 7 and 8 is monitored by the voltage measuring device 13 and is used to determine the resistance and thus the temperature of the element 1.

In operation of the apparatus described with reference to FIGS. 5 and 6, glass sheets which may be either bent or plane, are heated to a temperature between their strain and softening points, for example in the range 610° to 720°C for soda/lime/silica glass sheets, and are quenched by immersion in a body of chilling liquid for example MOBIL CYLREX FM, maintained at a selected temperature for example in the range 150° to 260°C. In carrying out this method, the electrical resistance element of the sensor 66 is held immersed in the liquid and a constant electric current of predetermined magnitude, for example 7 amps in the case of the platinum elements shown of the dimensions and construction described with reference to FIG. 1 or FIG. 2, is passed through the element. The potential difference across an immersed part of the element is effectively measured by application to the controller 13 in which it is compared with a datum voltage, and the controller 14 controls the supply of an additional liquid to the body of quenching liquid so as to regulate its heat transfer properties by renewing its efficacy as a glass toughening liquid, the additional liquid being drawn from the supply maintained for that purpose and being for example either rich in any additive which is included in the quenching liquid, or a supply of fresh unused liquid where no additive is used.

Similar processes may be carried out to toughen other glass articles, for example opthalmic lenses, motor headlamps glasses, containers and tableware.

In the above description, renewal of the heat transfer capability of the chilling liquid has been discussed in terms of tending to restore it to its original constitution, either by adding unused liquid where no additive is present, or by adding an additive rich liquid to restore the proportion of the additive in the main body of chilling liquid. However it will be appreciated that the renewal of the heat transfer capability of the liquid and hence its efficacy as a quenching medium is not necessarily dependent on restoring it to its original composition. All that may be required is the addition of liquid which will effectively maintain its heat transfer properties as a quenching medium for example as determined by the stresses induced in the articles quenched in it. Thus oil with a small proportion of an additive could be added to renew the condition of what had hitherto been only oil, whilst oil containing one additive could have oil containing a further additive added to it.

Further, whilst any process may during one period of time require the production of articles having given stresses, it may be necessary from time to time to produce articles having different stresses. This can be effected by changing the constitution of the chilling liquid, for example by changing the proportion of nature of any additive present. Thus while the selected datum value for the voltage derived from the resistance element of the sensor will remain constant as long as the same stresses are required, the addition of liquid to renew the condition of the quenching liquid being controlled to maintain the meausred voltage or current at the datum value, the datum value may itself be changed, for example by altering the set point adjustment on the controller 13 of FIG. 6 and the automatic control will then operate to bring about the required change, provided a suitable supply of liquid is available to regulate by replacement, the efficacy of the chilling liquid to induce the required stress condition in the glass.

I claim:

1. In apparatus for toughening a glass article including a particular chilling liquid for quenching a hot glass article which is in a sufficient thermal condition for toughening by said quenching, said particular chilling liquid being one which is subject to a change in heat transfer capability over a period of use, and further including means for placing the article in position to be quenched, and means for removing the article from the chilling liquid, the improvement comprising:
  an electrical sensor located in a circulatory system including a container for a body of said particular chilling liquid and operable to engender by contact with said chilling liquid an electrical signal which varies with any variation of the heat transfer capability of the said liquid with respect to a hot glass article to be toughened by quenching in said body of chilling liquid;
  means leading into said circulatory system for supplying reconstituting liquid to said chilling liquid; and
  control means connected to said sensor for controlling said supplying means to regulate the supply of reconstituting liquid to said chilling liquid in an amount sufficient to restore to a datum value the heat transfer capability of said chilling liquid in response to a variation in said electrical signal.

2. In apparatus for toughening a succession of glass articles including a container for a body of a particular chilling liquid which is operable to effect toughening of the glass articles and which is subject to a change in heat transfer capability over a period of use, means associated with that container for maintaining the body of chilling liquid at a predetermined temperature, means for immersing hot glass articles, in sufficient thermal condition for toughening by quenching in said chilling liquid, in succession in the said body of chilling liquid and means for removing the quenched glass articles from the chilling liquid; the improvement comprising:
  an electrical sensor, located in a circulatory system including the container, to be contacted by the particular chilling liquid for generating by said contact with the chilling liquid an electrical signal which varies with any variation of the heat transfer capability of the said chilling liquid with respect to the hot glass articles to be quenched in the body of chilling liquid;
  means leading into said circulatory system for supplying reconstituting liquid to said chilling liquid; and
  control means connected to said sensor for controlling said supplying means to regulate in response to a variation in said electrical signal the supply of reconstituting liquid to said chilling liquid in an amount sufficient to maintain at a datum value the heat transfer capability of said body of chilling liquid.

3. Apparatus according to claim 1, wherein:
  said electrical sensor is an electrical resistance element at least a part of which is positioned in the container to be contacted by said body of chilling liquid; and
  said control means includes
    an electrical supply circuit connected to the resistance element for passing an electric current therethrough,
    means in said electrical supply circuit for stabilising the current drawn from the supply circuit and thereby maintaining constant the current passing through said element, and
    voltage measuring means connected across at least a part of said resistance element to measure any variation in the voltage drop across said at least a part of said resistance element and to engender a voltage signal a variation of which signal is indicative of a variation from said datum value of the heat transfer capability of the body of chilling liquid with respect to a hot glass article to be quenched in said body.

4. Apparatus according to claim 1, wherein:
  said electrical sensor is an electrical resistance element at least a part of which is positioned in the container to be contacted by said body of chilling liquid; and
  said control means includes
    an electrical supply circuit connected to the resistance element for passing an electric current therethrough,
    means in said electrical supply circuit for stabilising the voltage of the output of the supply circuit thereby maintaining constant the voltage applied across said electrical resistance element, and
    current measuring means connected to said resistance element to measure any variation in the electric current flowing through said resistance element and to engender a current representing signal a variation of which signal is indicative of the heat transfer capability of the body of chilling liquid with respect to a hot glass article to be quenched in said body.

5. Apparatus for toughening a glass article by immersing a glass article when in a sufficient thermal condition for toughening in a body of a particular chilling liquid operable to effect the toughening of the glass article and which is subject to a change in heat transfer capability over a period of use, including:
  a container for a body of said particular chilling liquid;
  means for placing the article in position to be quenched in said chilling liquid;
  an electrical resistance element at least a part of which is positioned in said container below the normal surface level of said body of chilling liquid which electrical resistance element is operable to engender by contact with the chilling liquid an electrical signal which varies with any variation of the heat transfer capability of the said liquid with respect to a hot glass article to be toughened by quenching in said body of chilling liquid;
  an electric supply circuit connected to the resistance element for passing an electric current through the element;
  means in said electrical supply circuit for stabilising one electrical parameter of the supply;
  measuring means connected to at least a part of the resistance element for measuring a second electrical parameter, said measuring means including means responsive to any departure of said second electrical parameter from a datum value indicative of a datum value of heat transfer capability of the said chilling liquid with respect to a hot glass article to be immersed therein, for providing an indication and/or record of the capability as a quenching medium for toughening the glass article of the body of chilling liquid in the container; and means for removing the article from the chilling liquid.

6. Apparatus for toughening a glass article by immersing a glass article when in a sufficient thermal condition for toughening in a body of a particular chilling liquid which is operable to effect the toughening of the glass article and which is subject to a change in heat transfer capability over a period of use, comprising:
a container for a body of said particular chilling liquid;
means for placing the article in position to be quenched in said chilling liquid;
an electrical resistance element at least a part of which is located in said container below the normal surface level of chilling liquid and operable to engender by contact with the chilling liquid an electrical signal which varies with any variation of the heat transfer capability of the said chilling liquid with respect to a hot glass article to be immersed in the chilling liquid from a datum value of that heat transfer capability;
an electric supply circuit connected to the resistance element and operable to supply electric current thereto;
stabilising means in said electric supply circuit for stabilising one electrical parameter of the electric supply;
measuring means connected to at least a part of the resistance element for measuring a second electrical parameter, said measuring means including means responsive to any departure of said second electrical parameter from a datum value indicative of a datum value of heat transfer capability of the said chilling liquid with respect to a hot glass article to be immersed therein, to provide an electrical data signal indicative of any variation of the heat transfer capability of the body of chilling liquid in the container with respect to the hot glass article quenched therein;
electrical data signal responsive means connected to said measuring means for providing a sensible indication of the value of said electrical data signal; and
means for removing the article from the chilling liquid.

7. Apparatus for toughening a glass article by immersing the article when in a sufficient thermal condition for toughening in a body of a particular chilling liquid which is operable to effect the toughening of the glass article and which is subject to a change in heat transfer capability over a period of use, including:
a quench tank for containing a body of said particular chilling chilling liquid;
means for placing the article in position to be quenched in said chilling liquid;
means associated with said tank for maintaining the liquid at a selected temperature;
an electrical resistance element at least a part of which is positioned in said tank below the normal level of said body of chilling liquid;
an electric supply circuit connected to the resistance element for passing an electric current through the element;
means in said supply circuit for stabilising one electrical parameter of the supply;
measuring means connected to at least a part of the resistance element for measuring a second electrical parameter;
a supply of additional liquid connected to the quench tank;
means connecting said supply to said tank for drawing additional liquid from said supply and adding it to said body of chilling liquid to regulate to a datum value the heat transfer capability of the particular chilling liquid with respect to a hot glass article to be immersed therein; and
control means connected to said means for drawing additional liquid from said supply, and operable in response to a measurement of said second electrical parameter to control the feeding of additional liquid from said supply to the body of chilling liquid in an amount sufficient to restore the heat transfer capability of the chilling liquid to said datum value.

8. Apparatus according to claim 7, in which the control means includes an adjustable element which is settable to set a datum value of said second electrical parameter corresponding to a datum value of heat transfer capability of the chilling liquid to be maintained.

9. Apparatus according to claim 7, wherein said means for drawing additional liquid from said supply is arranged so that added liquid displaces liquid from said body of chilling liquid.

10. Apparatus according to claim 7, including:
a mixing container for holding the supply of additional liquid; and
a pump connecting said mixing container to the quench tank which pump is connected to said control means and is operable in response to a measurement of said second electrical parameter to control the feeding of additional liquid from the mixing container to the quench tank.

11. Apparatus according to claim 10, including:
a first reservoir for containing a supply of a first component of said chilling liquid;
a second reservoir for containing a supply of a second component of said chilling liquid;
first and second pumps respectively connecting said first and second reservoirs to said mixing container, which pumps are individually connected to said control means and are separately operable thereby to pump said first and second chilling liquid components from said reservoirs into the mixing container in predetermined relative quantities.

12. Apparatus according to claim 11, including mixing means in said mixing container.

13. Apparatus according to claim 11, including:
an overflow tank having a first inlet for chilling liquid connected to the quench tank, a second inlet connected through said first pump to said first reservoir, and an outlet;
a third pump connecting said overflow tank outlet to said mixing chamber;
first liquid level sensing means in the overflow tank connected to control means for the first pump and operable in response to a fall in the level of liquid in the overflow tank below a predetermined level to deliver said first component liquid to the overflow tank at a predetermined rate; and
second liquid level sensing means in the mixing container connected to control means for the third pump and operable in response to a fall in liquid level in the mixing chamber below a preset level to regulate pumping of liquid from the overflow tank to the mixing container.

14. In a method of toughening a glass article wherein the article when in a sufficient thermal condition for toughening is contacted with a particular chilling liquid which is operable to effect the toughening of the glass article and which is subject to a change in heat transfer capability over a period of use, the improvement comprising:

electrically generating by contact with said particular chilling liquid an electrical signal indicative of the heat transfer capability of the said chilling liquid with respect to a hot glass article to be contacted with the chilling liquid;

altering the constitution of the chilling liquid in response to variation in said electrical signal by supplying additional liquid to the particular chilling liquid in an amount sufficient to restore to a datum value the heat transfer capability of the chilling liquid with respect to a hot glass article to be contacted with the chilling liquid; and contacting a hot glass article with the chilling liquid whose constitution has been so altered to maintain said datum value of heat transfer capability.

15. In a method of toughening a glass article wherein the article when in a sufficient thermal condition for toughening is quenched in a body of a particular chilling liquid which is at a predetermined temperature and is operable to effect the toughening of the glass article, the particular chilling liquid being one subject to a change in heat transfer capability over a period of use, the improvement comprising:

electrically generating by contact with said particular chilling liquid an electrical signal indicative of the heat transfer capability of said body of said chilling liquid with respect to the hot glass article to be quenched in the body of chilling liquid;

altering the constitution of the body of chilling liquid in response to variation in said electrical signal by supplying additional liquid to the particular chilling liquid in an amount sufficient to maintain said body of chilling liquid in a datum heat transfer capability state with respect to the hot glass article to be immersed in the body of chilling liquid; and immersing the hot glass article in the body of chilling liquid whose heat transfer capability has been maintained in said datum state.

16. In a method of toughening a glass sheet wherein the sheet is heated to a pre-quenching temperature above its strain point to place it in a sufficient thermal condition for toughening, and the sheet is quenched in a body of a particular chilling liquid which is operable to effect the toughening of the sheet and which is subject to a change in heat transfer capability over a period of use, the improvement comprising:

electrically generating by contact with said particular chilling liquid an electrical signal indicative of the heat transfer capability of the said body of chilling liquid with respect to the faces of the hot glass sheet to be quenched in the chilling liquid;

altering the constitution of the chilling liquid in response to variation in said electrical signal by supplying additional liquid to the particular chilling liquid in an amount sufficient to maintain said body of chilling liquid in a datum heat transfer capability state with respect to the hot glass article to be quenched in the body of chilling liquid, which state corresponds to a stress pattern to be induced in the glass sheet; and quenching the hot glass sheet in the body of chilling liquid whose heat transfer capability has been maintained in said datum state.

17. A method of producing a bent and toughened glass sheet comprising:

heating a glass sheet to bending temperature;

bending the hot glass sheet to a desired curved shape;

establishing a pre-quenching thermal condition of the bent glass sheet to place it in a sufficient thermal condition for toughening by quenching in a body of a particular chilling liquid which is operable to effect such toughening and which is subject to a change in heat transfer capability over a period of use;

electrically generating by contact with said particular chilling liquid an electrical signal indicative of the heat transfer capability of the said body of chilling liquid with respect to the curved faces of the hot bent glass sheet to be quenched in the body of chilling liquid;

altering the constitution of the chilling liquid in response to variation in said electrical signal by supplying additional liquid to the particular chilling liquid in an amount sufficient to maintain said body of chilling liquid in a datum heat transfer capability state with respect to the hot glass article to be quenched in the body of chilling liquid, which state corresponds to a stress pattern to be induced in the bent glass sheet; and quenching the hot glass sheet in the body of chilling liquid whose heat transfer capability has been maintained in said datum state.

18. In a method of toughening a glass article wherein the article when in a sufficient thermal condition for toughening is quenched in a body of a particular chilling liquid which is operable to effect the toughening of the glass article and which is subject to a change in heat transfer capability over a period of use, the improvement comprising:

electrically generating by contact with the body of said particular chilling liquid an electrical signal indicative of the heat transfer capability of the said body of chilling liquid with respect to the hot glass article to be quenched in the body of chilling liquid;

maintaining a supply of additional liquid for addition to the body of chilling liquid to regulate the heat transfer capability thereof with respect to the hot glass article to be quenched therein;

controlling the feeding of additional liquid from said supply to the body of chilling liquid, in response to variation in said electrical signal, in an amount sufficient to maintain said chilling liquid in a datum heat transfer capability state with respect to said hot glass article; and quenching the hot glass article in the body of chilling liquid whose heat transfer capability has been maintained in said datum state by said controlled feeding of additional liquid.

19. In a method of toughening glass wherein the glass when in a sufficient thermal condition for toughening is quenched by immersion in a body of a particular chilling liquid which is maintained at a predetermined temperature and is operable to effect the toughening of the glass, the particular chilling liquid being one subject to a change in heat transfer capability over a period of use, the improvement comprising:

immersing at least a part of an electrical resistance element in said body of particular chilling liquid;

stabilising a first electrical parameter of an electrical supply passing an electric current through that resistance element;

measuring a second electrical parameter associated with an immersed part of said resistance element thereby generating in said body of chilling liquid an electrical signal indicative of the heat transfer capability of the said chilling liquid with respect to hot glass to be quenched in the body of chilling liquid;

maintaining a supply of additional liquid for addition to the body of chilling liquid to regulate the heat transfer capability thereof with respect to hot glass to be quenched in said body of chilling liquid;

controlling the feeding of additional liquid from said supply to the body of chilling liquid, in response to variation in said electrical signal from a datum value indicative of a datum heat transfer capability of the body of chilling liquid with respect to the hot glass to be quenched in the body of chilling liquid, in an amount sufficient to control said heat transfer capability of the body of chilling liquid; and quenching the hot glass in the body of chilling liquid whose heat transfer capability has been controlled by feeding of additional liquid.

20. A method according to claim 19, comprising constituting said additional liquid so as to restore the heat transfer capability of the chilling liquid with respect to hot glass to be quenched in said body of chilling liquid and thereby maintain its efficacy as a glass toughening liquid.

21. A method according to claim 20, wherein the additional liquid has the same constitution as the chilling liquid of said body.

22. A method according to claim 19, comprising constituting said body of chilling liquid from a major proportion of a high boiling point liquid with a minor proportion of a low boiling point liquid, and constituting the additional liquid from a major proportion of said high boiling point liquid and a proportion of said low boiling point liquid higher than said minor proportion constituent of said body of chilling liquid.

23. A method according to claim 19, comprising feeding the additional liquid into said body of chilling liquid in such a way as to displace liquid from said body of chilling liquid.

24. A method according to claim 19, comprising stabilising the electric current passed through the resistance element, and generating said electrical signal by measuring the voltage drop across said immersed part of the resistance element.

25. A method according to claim 19, comprising stabilising the voltage of the supply of electric current passed through the resistance element, and generating said electrical signal by measuring the current flowing through the resistance element.

26. A method of testing the heat transfer capability of a particular chilling liquid with respect to a glass article which is in a sufficient thermal condition for toughening and which is to be quenched in the particular chilling liquid to effect thermal toughening of a glass article, which particular chilling liquid is subject to a change in heat transfer capability over a period of use, the method comprising contacting the chilling liquid with an electrical resistance element, passing an electric current through the element from a stabilised electric supply circuit, stabilising one electrical parameter of the supply to the element from the supply circuit, and measuring a second electrical parameter at said element in contact with the chilling liquid to provide a measure of said heat transfer capability of the chilling liquid thereby indicating efficacy of the chilling liquid as a quenching medium for thermally toughening said thermally conditioned glass article to be quenched therein.

27. A method according to claim 26, wherein the step of stabilising one electrical parameter of the supply consists of stabilising the current drawn from the supply circuit by the electrical resistance element, and the step of measuring said second electrical parameter consists of measuring the voltage drop across at least a part of the resistance element.

28. A method according to claim 26, wherein the step of stabilising one electrical parameter of the supply consists of stabilising the voltage of the output of the supply circuit applied across the electrical resistance element, and the step of measuring said second electrical parameter consists of measuring the current flowing through the resistance element.

29. A method of testing the heat transfer capability of a particular chilling liquid with respect to glass which is in a sufficient thermal condition for toughening and which is to be quenched in the particular chilling liquid to effect thermal toughening of glass, which particular chilling liquid is subject to a change in heat transfer capability over a period of use, the method comprising:

contacting the chilling liquid with an electrical resistance element;

passing an electric current through the element from a stabilised electric supply circuit connected to said resistance element;

stabilising one electrical parameter of the supply to the element from the supply circuit; and measuring a second electrical parameter at said element in contact with the chilling liquid to provide a measure of the heat transfer capability of the chilling liquid thereby indicating efficacy of the chilling liquid as a quenching medium for thermally toughening said thermally conditioned glass article to be quenched therein.

30. In a method of toughening a glass article wherein the article when in a sufficient thermal condition for toughening is contacted with a particular chilling liquid which is operable to effect the toughening of the glass article and which is subject to a change in heat transfer capability over a period of use, the improvement comprising:

providing a circulation of said particular chilling liquid;

electrically generating by contact with the circulating particular chilling liquid an electrical signal indicative of the heat transfer capability of the said chilling liquid with respect to a hot glass article to be contacted with the chilling liquid;

altering the constitution of the chilling liquid in response to variation in said electrical signal by supplying additional liquid to the particular chilling liquid in an amount sufficient to restore to a datum value the heat transfer capability of the chilling liquid with respect to a hot glass article to be contacted with the chilling liquid; and contacting a hot glass article with the circulating chilling liquid whose constitution has been so altered to maintain said datum value of heat transfer capability.

31. In a method of toughening a succession of glass articles wherein the articles when in a sufficient thermal condition for toughening are quenched in succession in a body of a particular chilling chilling liquid which is operable to effect the toughening of the glass articles and which is subject to a change in heat transfer capability over a period of use, the improvement comprising:

providing a circulation of chilling liquid including the particular chilling liquid of said body;

generating by contact with the said particular chilling liquid an electrical signal indicative of the heat transfer capability of the said body of particular chilling liquid with respect to hot glass articles to be quenched therein;

altering the constitution of the chilling liquid in response to variation in said electrical signal by supplying additional liquid to the particular chilling liquid in an amount sufficient to maintain at a datum value the heat transfer capability of the body of chilling liquid with respect to the succession of hot glass articles to be quenched therein; and quenching the hot glass articles in succession in the body of chilling liquid whose constitution has been so altered to maintain said datum value of heat transfer capability and thereby produce a succession of toughened glass articles having consistent strength and fracture characteristics.

32. In a method of toughening a glass article wherein the article when in a sufficient thermal condition for toughening is contacted with a particular chilling liquid which is operable to effect the toughening of the glass article and which is subject to a change in heat transfer capability over a period of use, and the surface of the glass undergoes an initial immediate temperature drop, the improvement comprising:

determining the high temperature end of said initial immediate temperature drop by setting the initial temperature of the glass article;

electrically generating by contact with the particular chilling liquid an electrical signal indicative of the heat transfer capability of the said chilling liquid with respect to the hot glass article;

altering the constitution of the chilling liquid in response to variation in said electrical signal by supplying additional liquid to the particular chilling liquid in an amount sufficient to maintain a value of the heat transfer capability of the chilling liquid with respect to the hot glass article which value of heat transfer capability determines the lower end of said initial immediate temperature drop; and contacting the hot glass article with the chilling liquid whose heat transfer capability has been so maintained at said value to induce a predetermined stress condition in the glass article.

33. Apparatus for toughening a glass article by quenching a hot glass article in a sufficient thermal condition to be toughened with a particular chilling liquid which is operable to effect the toughening of the glass article and which is subject to a change in heat transfer capability over a period of use, comprising:

a circulatory system for the chilling liquid;

means for introducing the hot glass article into contact with the particular chilling liquid in said circulatory system;

an electrical sensor, located in the circulatory system, to be contacted by said chilling liquid and operable to engender through said contact an electrical signal which varies with any variation of the heat transfer capability of the liquid with respect to a hot glass article to be toughened by quenching in said chilling liquid;

means leading into said circulatory system for supplying reconstituting liquid into said chilling liquid;

control means connected to said sensor for controlling said supplying means to regulate the supply of reconstituting liquid to said chilling liquid in an amount sufficient to restore to a datum value the heat transfer capability of said chilling liquid in response to a variation in said electrical signal; and means for removing the article from the chilling liquid.

34. Apparatus according to claim 33, wherein:

said electrical sensor is an electrical resistance element at least a part of which is positioned in said circulatory system to be contacted by said chilling liquid; and said control means includes an electrical supply circuit connected to the resistance element for passing an electric current therethrough, means in said electrical supply circuit for stabilising the current drawn from the supply circuit and thereby maintaining constant the current passing through said element, and voltage measuring means connected across at least a part of said resistance element to measure any variation in the voltage drop across said at least a part of said resistance element and to engender a voltage signal a variation of which signal is indicative of a variation from said datum value of the heat transfer capability of the chilling liquid with respect to a hot glass article to be quenched in the chilling liquid.

35. Apparatus according to claim 33, wherein:

said electrical sensor is an electrical resistance element at least a part of which is positioned in said circulatory system to be contacted by said chilling liquid; and said control means includes an electrical supply circuit connected to the resistance element for passing an electric current therethrough, means in said electrical supply circuit for stabilising the voltage of the output of the supply circuit thereby maintaining constant the voltage applied across said electrical resistance element, and current measuring means connected to said resistance element to measure any variation in the electric current flowing through said resistance element and to engender a current representing signal a variation of which signal is indicative of the heat transfer capability of the chilling liquid with respect to a hot glass article to be quenched in the chilling liquid.

36. In apparatus for toughening a glass article including a particular chilling liquid for quenching a hot glass article which is in a sufficient thermal condition for toughening by said quenching, said particular chilling liquid being one which is subject to a change in heat transfer capability over a period of use, and further including means for placing the article in position to be quenched, and means for removing the article from the chilling liquid, the improvement comprising:
- an electrical sensor, located in a container for a body of said particular chilling liquid, to be contacted by said body of the particular chilling liquid and operable to engender by said contact with said chilling liquid an electrical signal which varies with any variation of the heat transfer capability with respect to a hot glass article to be toughened by quenching in said body of particular chilling liquid;
- means connected to the container for supplying reconstituting liquid to said body of particular chilling liquid; and
- control means connected to said sensor for controlling said supplying means to regulate the supply of reconstituting liquid to said body of chilling liquid in an amount sufficient to restore to a datum value the heat transfer capability of said chilling liquid in response to a variation in said electrical signal.

37. In apparatus for toughening a succession of glass articles in a sufficient thermal condition for toughening by quenching, the apparatus including a container for a body of particular chilling liquid, which is operable to effect toughening of the glass articles and which is subject to a change in heat transfer capability over a period of use, means associated with that container for maintaining the body of particular chilling liquid at a predetermined temperature, means for immersing hot glass articles in succession in the body of said particular chilling liquid, and means for removing the articles from the chilling liquid; the improvement comprising:
- an electrical sensor, located in the container, to be contacted by the chilling liquid for generating by said contact with said chilling liquid an electrical signal which varies with any variation of the heat transfer capability of the chilling liquid with respect to the hot glass articles to be quenched in the body of chilling liquid;
- means connected to the container for supplying reconstituting liquid to said body of particular chilling liquid; and
- control means connected to said sensor for controlling said supplying means to regulate in response to a variation in said electrical signal the supply of reconstituting liquid to said body of chilling liquid in an amount sufficient to maintain at a datum value the heat transfer capability of said body of chilling liquid.

38. In a method of toughening a glass article wherein the article when in a sufficient thermal condition for toughening is contacted with a particular chilling liquid which is operable to effect the toughening of the glass article and which is subject to a change in heat transfer capability over a period of use, the improvement comprising:
- electrically generating by a contact with said particular chilling liquid an electrical signal indicative of the heat transfer capability of said chilling liquid with respect to a hot glass article to be contacted with the chilling liquid;
- altering the constitution of the chilling liquid in response to variation in said electrical signal by supplying a constituent of the chilling liquid to the particular chilling liquid in an amount sufficient to restore to a datum value said heat transfer capability of the chilling liquid; and
- contacting the hot glass article with the chilling liquid whose constitution has been so altered to maintain said datum value of heat transfer capability.

* * * * *